June 16, 1936.  J. J. TATUM  2,044,513
CAR BODY CONSTRUCTION
Filed Aug. 9, 1934    7 Sheets-Sheet 1
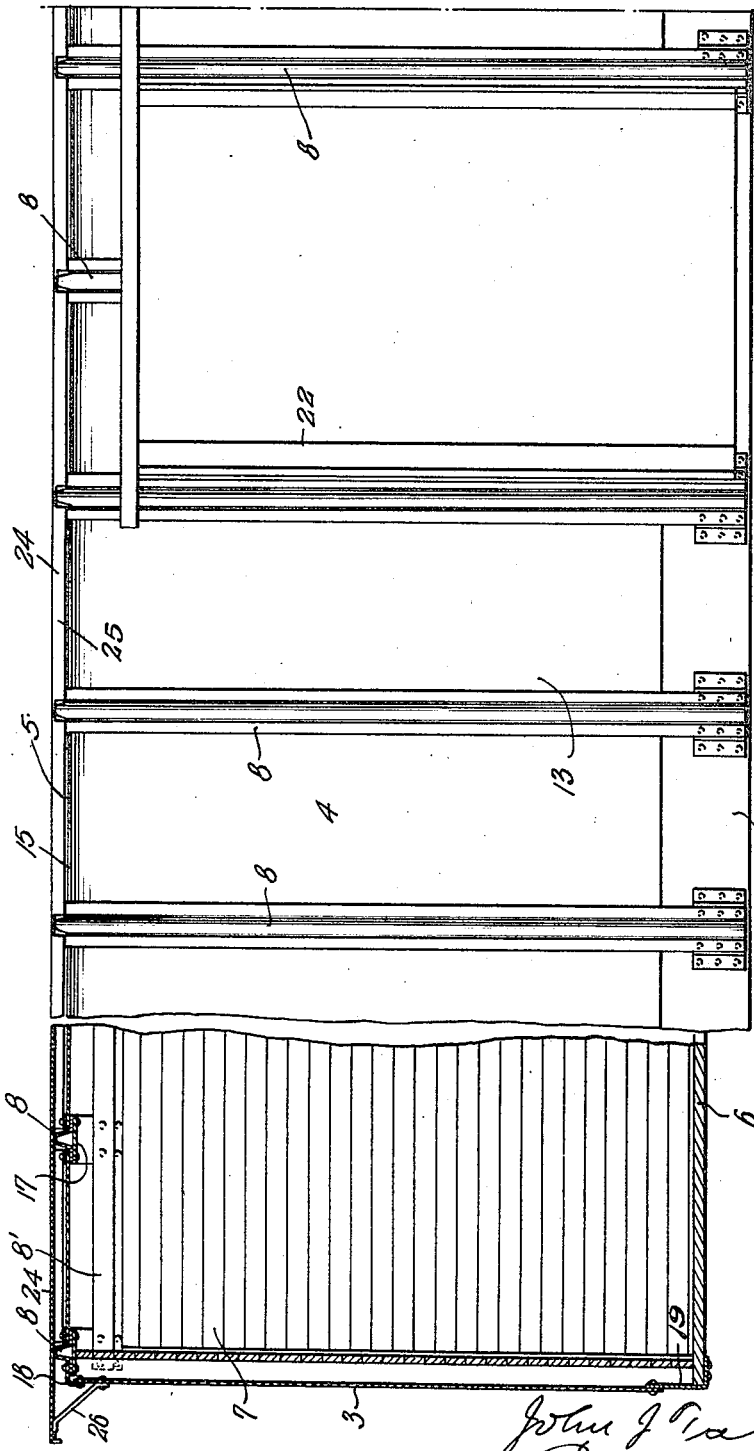

June 16, 1936. J. J. TATUM 2,044,513
CAR BODY CONSTRUCTION
Filed Aug. 9, 1934 7 Sheets-Sheet 2
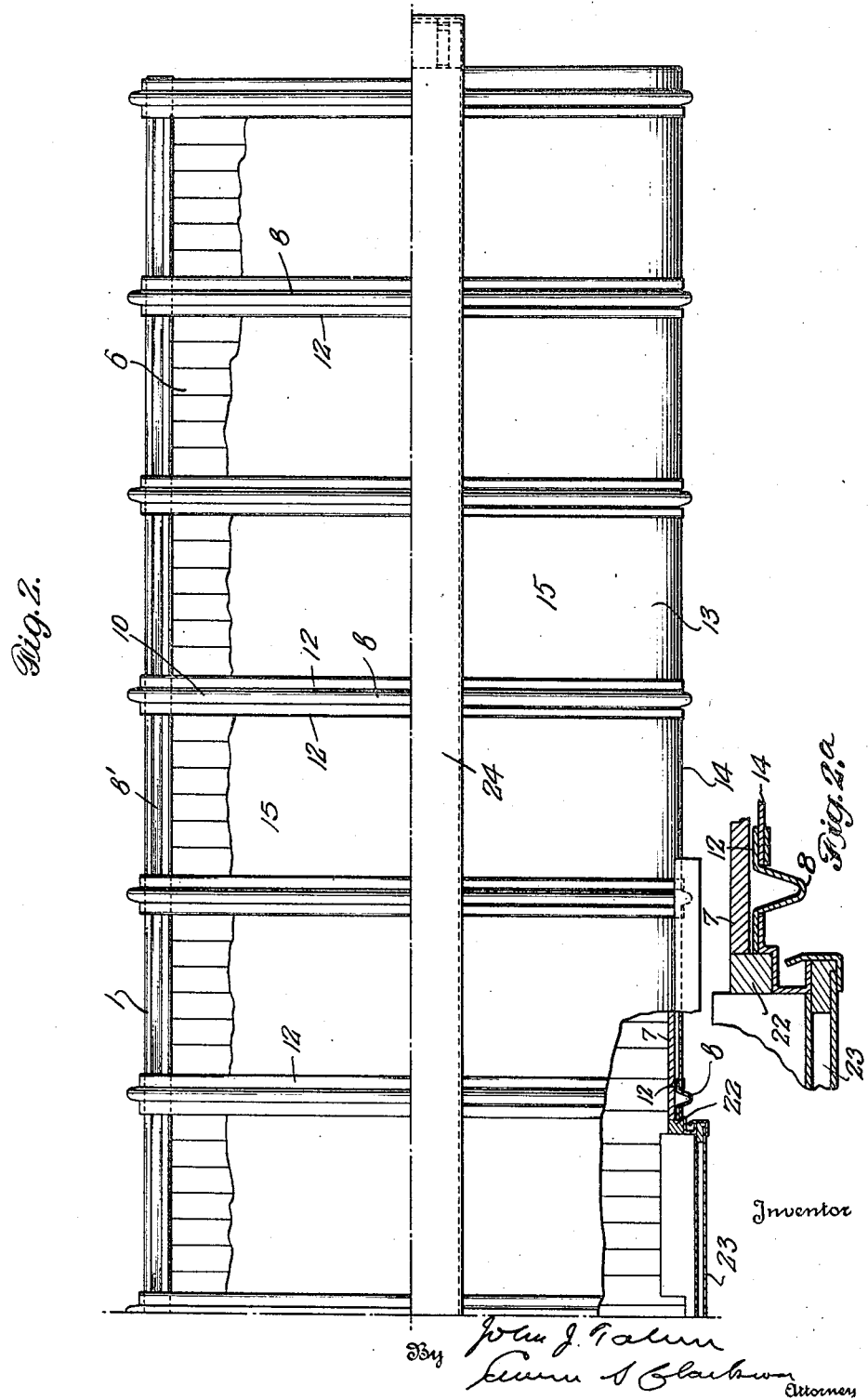

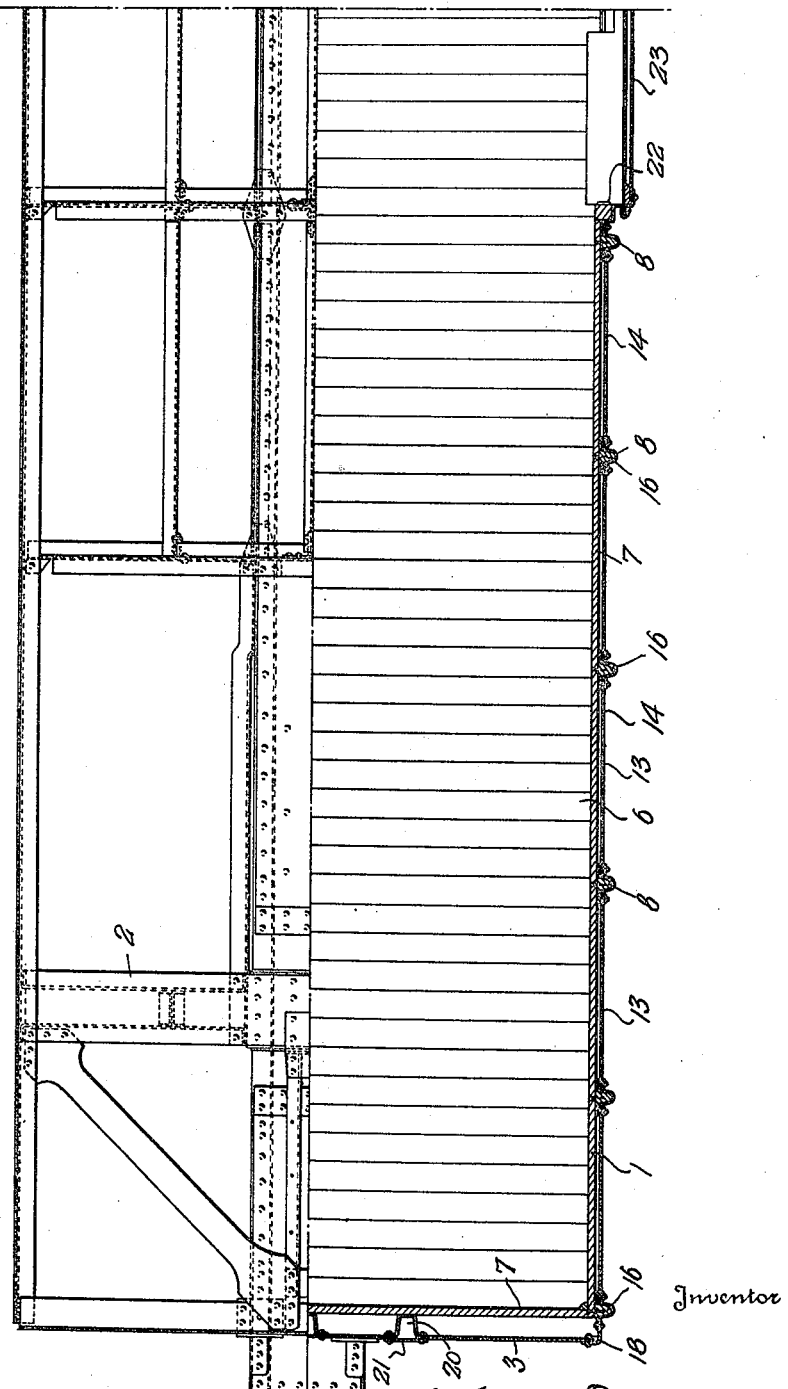

June 16, 1936.                J. J. TATUM                2,044,513
                         CAR BODY CONSTRUCTION
                         Filed Aug. 9, 1934         7 Sheets-Sheet 4
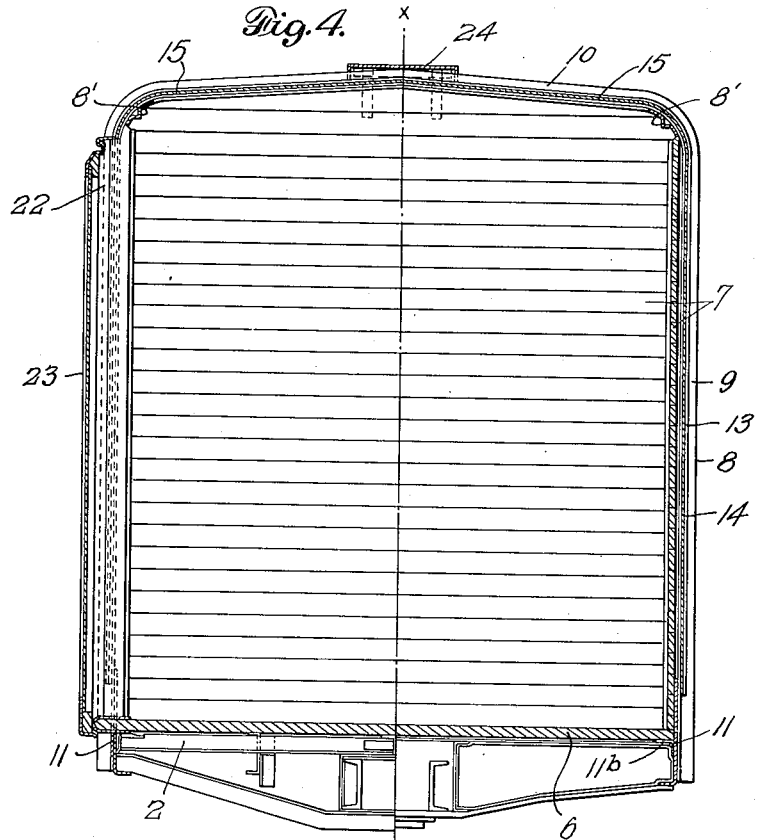
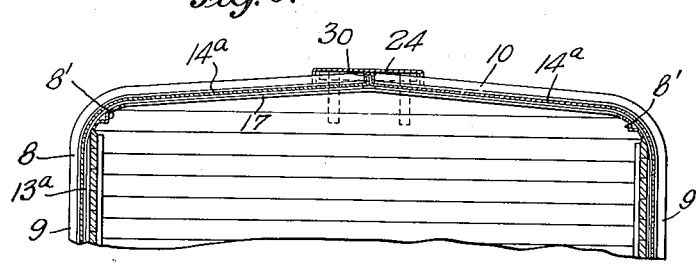
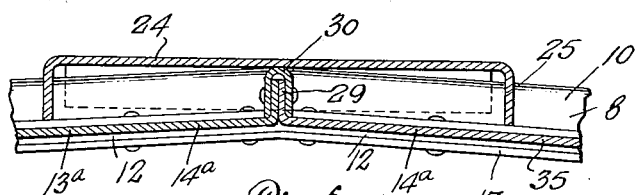

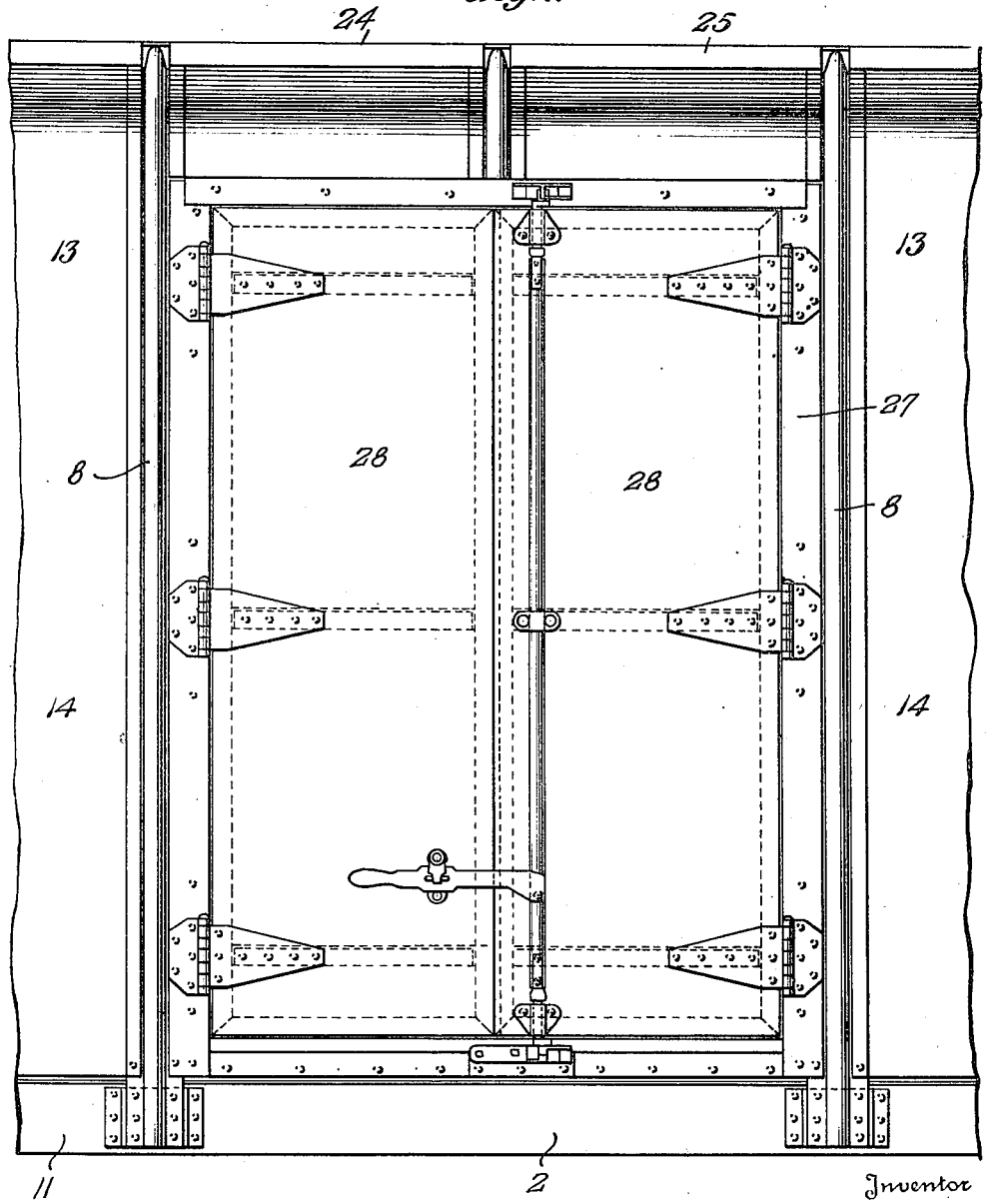

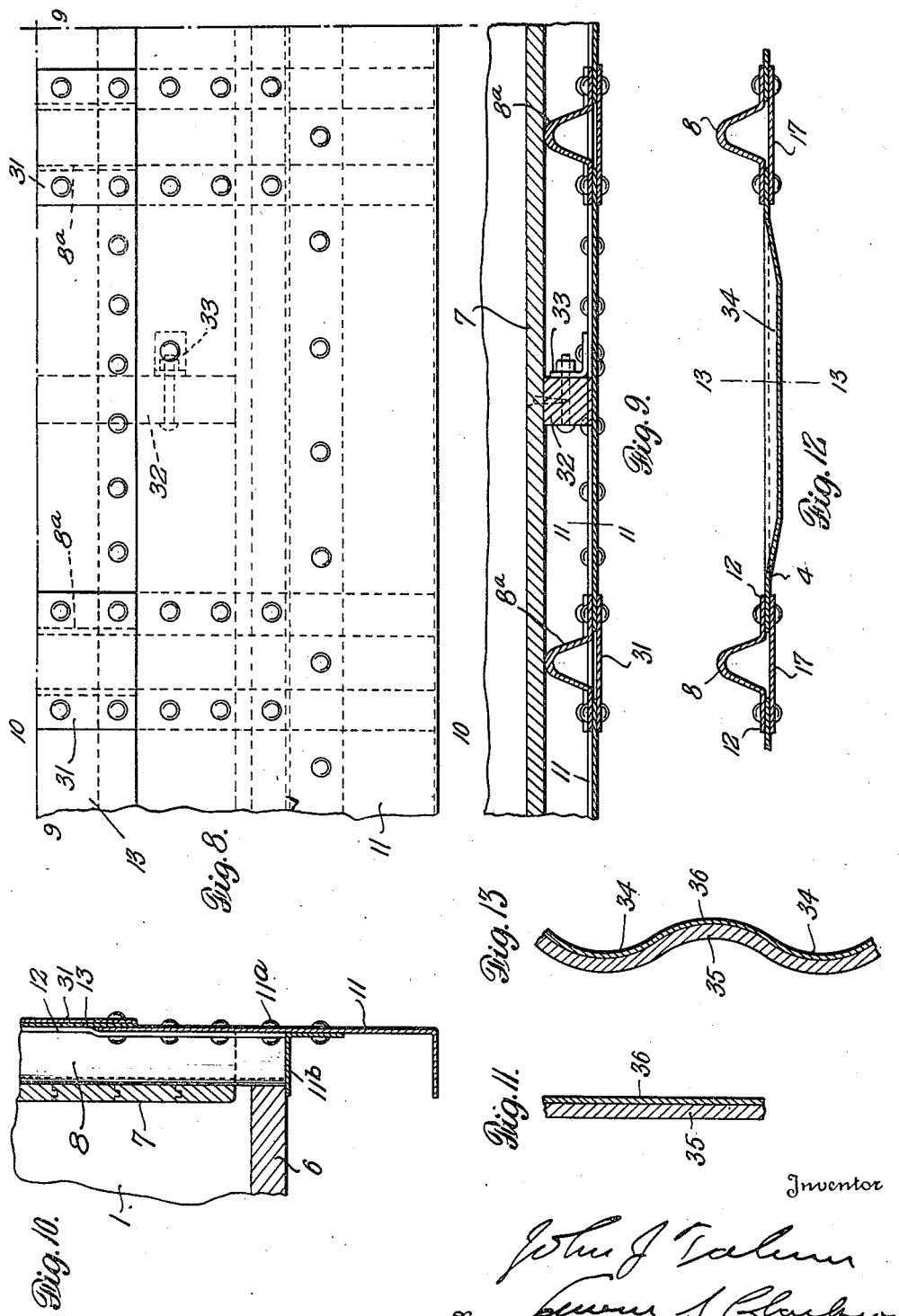

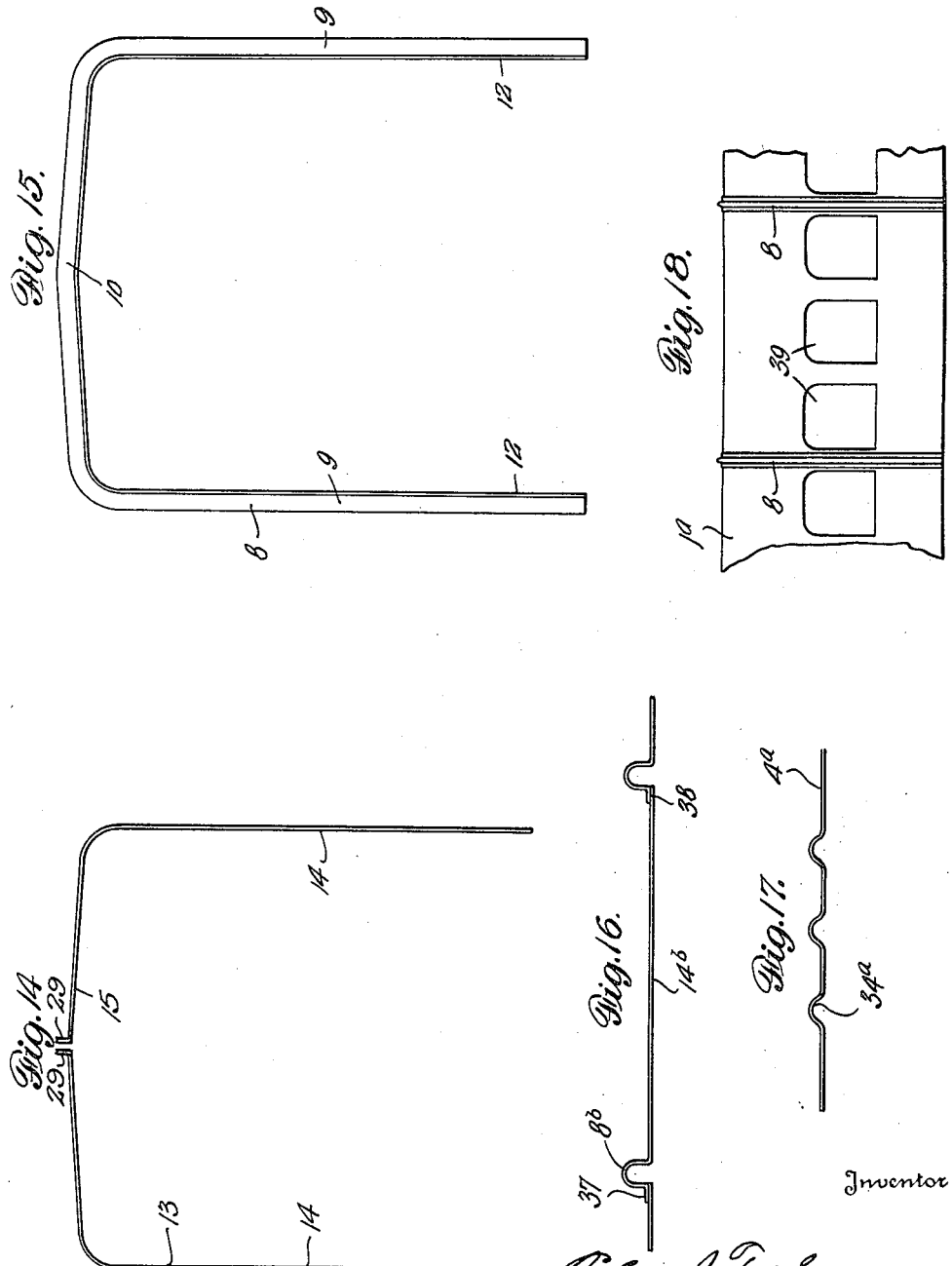

Patented June 16, 1936

2,044,513

UNITED STATES PATENT OFFICE 2,044,513

CAR BODY CONSTRUCTION

John J. Tatum, Baltimore, Md.

Application August 9, 1934, Serial No. 739,153

21 Claims. (Cl. 105—409)

This invention relates to improvements in the construction of the bodies of railway freight and passenger cars and like vehicles, and particularly to improvements in the construction of metallic car bodies, that is, car bodies in which at least the elements of the shell of the body, comprising the side and roof sheets and the coacting framing parts and connections, are formed of metal.

One object of the invention is to provide a metallic body structure of covered-wagon-like type which is of maximum strength, lighter weight, comprises fewer parts, joints and seams, and which is of less cost in production and maintenance, than car bodies of prior constructions.

Another object of the invention is to provide a body construction which is less subject to distortion from weaving and other body movements and less liable to leakage and entrance of the elements to the inside of the car than car bodies of prior constructions, which allows a maximum of inside width to be obtained within American Railway Association clearance dimensions, and which comprises parts capable of being combined to facilitate and reduce working time in constructing the body.

Still another object of the invention is to provide a type of metallic car body structure which is adapted for use in the construction of the bodies of both freight and passenger cars.

Still another object of the invention is to provide a body construction in which longitudinal bottom side plates or sheets fastened to the car underframe are employed for supporting the body forming members and the floor from the underframe.

With these and other objects in view, the invention consists of the features of construction, combination and arrangement of parts, hereinafter fully described and claimed, reference being had to the accompanying drawings, in which:—

Fig. 1 is a view in side elevation, partly in vertical section, of one half of a freight car body constructed in accordance with the invention.

Fig. 2 is a top plan view, partly in section, of the remaining half thereof.

Fig. 2a is a detail section through a portion of the car body.

Fig. 3 is a view of the part of the body illustrated in Fig. 1 shown at one side of its longitudinal center in horizontal section above the floor line and having the floor boards removed at the opposite side of its longitudinal center to expose the underframe.

Fig. 4 is a vertical transverse section taken in two planes on opposite sides of its center line $x$—$x$ through the car body.

Fig. 5 is a vertical transverse section through the upper part of the car body, showing a modified construction thereof.

Fig. 6 is a similar view of parts shown in Fig. 5 on an enlarged scale.

Fig. 7 is a fragmentary side elevation on an enlarged scale showing the application of swinging instead of sliding doors.

Fig. 8 is a view in elevation of the lower portion of a side wall of the body on an enlarged scale showing a modified construction.

Fig. 9 is a horizontal section on line 9—9 of Fig. 8.

Fig. 10 is a vertical section on line 10—10 of Fig. 8.

Fig. 11 is a vertical section on line 11—11 of Fig. 9.

Fig. 12 is a horizontal section showing the use of a corrugated metal side sheet.

Fig. 13 is a vertical section on line 13—13 of Fig. 12.

Fig. 14 is an edge view of a sheet section comprising a pair of complementary sheet units each forming a side sheet and one half of a roof sheet of the body.

Fig. 15 is an edge view of one of the body frame members or beams.

Fig. 16 is a view showing a modification in which the body frame members are formed on and as unitary parts of the metal sheets.

Fig. 17 is a view of a sheet having reinforcing corrugations.

Fig. 18 is a fragmentary side elevation showing the embodiment of the invention in a passenger car body.

Referring now more particularly to the drawings, 1 designates a car body constructed in accordance with my invention, and 2 the car body underframe, which may be of ordinary construction or suitably modified, when required, for the mounting of the car body thereon.

The body 1 comprises generally end walls 3, side walls 4, a roof 5 and a floor 6, and may be provided or not, as desired, upon the inner faces of its end and side walls with a lining 7 of boarding or other suitable material.

In its specific constructional organization the body comprises a series of frame members or beams 8 extending transversely of the car and arranged at spaced intervals apart from end to end of the car. Each of these frame members or beams is of arched or inverted U form so as to provide a pair of vertically disposed side post portions 9 connected at their upper ends by a top cross piece or carline portion 10 which is preferably slightly curved or arched or so shaped as to be highest at a central point and thence inclined downwardly toward the post portions to give proper slope to the roof sheets, as hereinafter described. The post portions 9 are rigidly secured at their lower ends to bottom side plates or sheets 11 extending longitudinally at the sides of the car from end to end thereof and fastened at 11a to underframe 2 so that the frame members 8 will be rigidly supported in position. These side plates or sheets 11 carry angle metal brackets 11b which extend under and support or assist in supporting the floor 6. Each frame member is preferably of the cross-sectional form shown, that is, comprises a V or trough-shaped channeled body provided at each side with a laterally extending flange 12, the channels in the form of the invention shown in Figs. 1, 2, 3, 4 and 15 being arranged to face inwardly. Channeled longitudinal stay or tie bars 8' may be fastened to the series of frame members at each side of the car to connect and hold the same against displacement longitudinally of the car.

The frame members 8 and side plates 11 support the walls of the car, which consist of sheet sections arranged adjacent to each other and between adjacent frame members and disposed transversely of the body to constitute a roof portion and two side wall portions. Each sheet section 13 comprises two members or half sections 13a and 13b, each of a width to fit in the space between the post portions 9 and carline portions 10 of adjacent frame members or beams and to underlap the flanges 12 thereof, and each of said portions or half sections 13a and 13b extends from the side plate 11 at one side of the body upwardly to the roof ridge, so that each half sheet section provides a side sheet portion 14 and a roof sheet section 15 continuous therewith. The sheets are riveted or otherwise rigidly secured at their side edges to the flanges 12 of the frame members and at their lower ends to the side plates 11. The upper edges of the half sections are provided at the roof ridge point with upstanding flanges 29 for abutting contact with each other, and over these flanges may be fitted an inverted U-shaped shield or ridge piece 30 which is riveted or otherwise secured thereto and serves as a guard against leakage at the joint and to rigidly stay the roof sheets at this point. The shield or ridge pieces 30 extend between the carline portions 10 of the body frame pieces 8 and may be riveted, welded or otherwise secured thereto. Where the channels of the frame members are arranged to face inwardly, as in the stated form of construction, the channels of the side post portions may be utilized as holders to receive wooden filler strips 16 to which the lining board 7 may be secured by suitable fastenings, while the channels of the carline portions may be closed by splice plates 17 secured by the same fastenings as the roof sheets to the frame members, and which splice plates may serve as brackets or supports for any contiguous fixtures employed in the roof zone of the car body. The sides and roof of the car body thus formed will, it will be seen, consist of unitary arched frame members supported from the underframe and comprise side and roof sheet sections between adjacent frame members composed of complementary units or half sections joined at the roof ridge and which are continuous from the center of the roof to the sills of the underframe. The end walls 3 of the car may consist of sheets of suitable width riveted or welded together at their adjacent edges and to angle members 18 and 19 attached to the flanges of the end frames and to the floor of the car. If desired, the end sheets may be formed with reinforcing channels 20 closed at their outer sides by bridge plates 21 and forming stays or abutments for the linings of the end walls, which may be fastened thereto if desired and to the linings of the side walls or other complementary parts of the wall structures.

In the embodiment of the invention in a freight car, the car body may be provided at each side with one or more doorway frames 22 for sliding doors 23. These frames may be conveniently fitted within a doorway opening formed by omitting portions of the posts of one of the frame members 8 and portions of the adjacent side sheets below the intended level of the lintels of the door frames and disposing the door frames in the double spaces thus created and securing them to the posts of the other contiguous frame members and the portions of the shortened frame member and sheets. The door frames thus arranged will coact with the frame members to which they are attached to give additional strength and rigidity to the body structure.

Where a running board or raceway is to be applied to the roof of the car, the carline portions of the frame members may be utilized to support the running board, which may be of novel construction for the purpose. The running board 24 herein shown is made of sheet metal and rests at the center of the roof upon the ridges of the carline portions 10 and is provided along its longitudinal edges with downturned flanges 25 with clear space above the roof sheets for train men to hold on to edge of running board, said flanges being notched to receive the carline portions and fastened thereon, whereby the running board is firmly supported in place. The running board may be riveted, welded or otherwise secured to the roof carlines and its end extensions may be connected to and reinforced from the end sheets by braces 26. This provides a running board construction which is readily applicable to a body of the character described. It will be observed that the shields or ridge pieces 30 serve incidentally as supplemental supports for the runway platform or running board to prevent sagging of the same under weight between the frame members, so that the runway platform will be firmly supported and may be made of lighter metal if desired.

Fig. 7 shows a construction in which swinging doors are employed in the sides of the car in lieu of sliding doors. The frame 27 of the doors 28 of this type may be fitted in place in openings in the side walls formed in the same manner as previously described in connection with the frames of sliding doors by the simple omission of side portions of plate between the frame members and portions of the side sheets of two additional sheet units.

By the formation of the body in the manner described it will be evident that a body structure is produced which is of maximum strength, lighter weight and comprises fewer parts, joints and seams than metallic car bodies of prior construction, and which is also less costly in production and maintenance. This construction of car body, because all of its parts are firmly combined and united with a material reduction of seams and joints is not liable to distortion by weaving and other body working motions and is much less liable to leakage and the entrance of the elements to the interior of the car because of its staunchness of construction and the small number of joints and seams required. It is particularly strong and rigid and distortion resisting in the roof zone and, because of the compact form of its walls, may be made of maximum inside width while retaining its outside width safely within American Railway Association clearance dimensions. Other advantages in point of ease and simplicity of construction and reduction in maintenance costs will be obvious to those versed in railway car construction and operation.

Instead of forming and disposing the frame members so that their channels face inwardly, as above described, they may be formed and arranged so that their channels face outwardly, as shown particularly in Figs. 8, 9 and 10. When this construction and arrangement of the frame members 8a is employed the outwardly facing open sides of the channels of the frame members are closed by bridge or splice plates 31 which are riveted or otherwise firmly secured with the wall sheets to the frame members. With this construction the closed side of the frame members 8a may be arranged to form abutments against which the wall lining 7 bears and wooden nailing posts 32 may be secured on the inner sides of the sheets by bolts and brackets 33 to which the lining board 7 may be secured.

In all forms of the invention the metal sheeting composing the side, roof and end sheets may be suitably reinforced, as by providing the same with corrugations, extending either longitudinally or transversely thereof, so that the sheets themselves will be reinforced and rendered rigid to any desired degree. In Figs. 12 and 13 is shown a sheet 4 provided with transversely extending corrugations 34, while in Fig. 17 is shown a sheet 4a provided with vertical corrugations 34a.

In practice the frame members and the combination side and roof sheets are preferably, though not necessarily, made of veneered metal, that is to say, these metal parts shown as made of single thickness in the enlarged scale views, Figs. 7, 8, 9, 11, may, as shown in Figs. 10 and 12, be made of an outer layer 35 of a common or cheap grade of metal and an inner layer 36 of a choice metal, such as stainless steel or non-corrosive metal. This will permit, when desired, of the use of a wall without an inner lining, which wall will be provided with an inner surface of non-corrosive metal designed to come in contact with the lading, thus obviating liability of damage by some kinds of lading and at the same time ensuring longer life to the surfaces of the walls of the car which are subject to constant wear and corrosion by rubbing or other contact with lading.

In Fig. 16 I have shown a type of body forming construction of channeled frame members and wall forming sheets in which the frame members and wall sheets are unitarily constructed. As shown each wall sheet 14b is provided at one of its side edges with a channeled portion 8b constituting the frame member, at the outer side of which said edge of the sheet is provided with a lap flange 37, the side edges of the sheet opposite the frame member 8b and flange 37 being straight or lying in the plane of the body of the sheet, as indicated at 38. With this construction the sheets and their channeled frame members 8b are secured to the side sills or their equivalents of the underframe and are united to each other by lapping the flange 37 of one sheet over upon the edge 38 of the other and adjacent sheet and riveting or welding the same thereto.

While an important and desirable feature of my invention is the provision of side and roof sheet sections in two pieces or half sections of unitary construction, it is to be understood that, under some conditions, each sheet unit or half section, may be formed of one or more sections of one or more thicknesses riveted or welded together prior to or after application.

The construction of car body herein shown and described is equally well adapted for use in connection with freight car bodies and passenger car bodies, or other vehicles, as in the embodiment of the invention in a passenger car body interior fixtures may be applied to the side and roof walls by the use of filler blocks in the channels of the frame members or attaching brackets or other means suitably secured to the frame members or sheets of the wall structure. In the construction of a car body for passenger use the body may be built up with sheets which are imperforate or have been previously perforated for the reception of the required window frames or windows. Where the car body is built up of imperforate sheets the window, door and ventilation openings may be formed by simply outlining them at proper points and then employing an electric arc method or other suitable method of cutting out the metal along the indicated lines. This provides a method whereby the elements may be conveniently applied in position without liability of distortion and the openings then formed in the sheets of the built up structure.

In Fig. 18 I have shown such a portion of a car body 1a of a design suitable for passenger use and in which window openings 39 have been formed in the manner described.

A car body constructed in accordance with my invention may be used in converting wooden body cars into metal body cars by removing the wooden body and mounting on the old car underframe my improved body. This may be done with little or no change in the underframe structure.

The troughs or hollow portions of the arched frames closed by the plates 17, as shown in Figs. 8, 9 and 12, also function as baffles against driving rain and other elements to prevent the elements from hitting the edge of the roof and side sheets when they are fastened to the flanges of the arched frame members, whereby the elements will be prevented from passing inside the car through the said joint.

From the foregoing description, taken in connection with the accompanying drawings, the mode of construction of my improved car body and its advantages will be readily understood by those versed in the art without a further and extended description. It is to be understood that while the structures disclosed, for purposes of exemplification are preferred, changes in the form, construction and arrangement of the parts may be made within the scope of the appended claims, without departing from the spirit or sacrificing any of the advantages of the invention.

What I claim is:—

1. A car body comprising transversely divided body members each of arched formation and consisting of sheet metal sections forming opposed side sheets and complemental portions of a roof sheet, the roof sheet portions having upwardly projecting flanged abutting edges, a ridge piece embracing and closing the joint between said flanged edges, and unitary arched frame members of flanged ∩-shaped cross-section adapted to be fastened to the car underframe and having their channels arranged between and their flanges fastened to the adjacent edges of the body sections.

2. A car body comprising transversely divided body sections each of arched formation and forming side sheet and roof sheet portions, unitary arched frame members of flanged ∩-shaped cross-section adapted to be fastened to the car underframe and having their channels projecting outwardly and arranged between and their flanges lapping and fastened to the adjacent edges of the body sections, each frame member having its end portions forming posts at the sides of the body and its intermediate portion forming a carline extending from side to side of the roof and integrally continuous with its post portions, and a runway extending over said roof sheet portions and resting on the outwardly projecting channels of the carline portions of the arched frame members.

3. In a car body construction, the combination of arched frame members of channeled form in cross-section and extending continuously from the bottom of each side of the body upwardly and across the roof portion of the body, sheet metal sections arranged between the adjacent frame members and attached thereto, each section comprising complementary half sections of similar form extending at opposite sides from the bottom of the body to the roof ridge and forming side wall portions and roof portions, the latter-named portions of the half sheets having abutting edges joined at the ridge point, and an inverted U-shaped shield or ridge piece fitting over the joined edges of the half sections and rigidly secured thereto and to the roof portions of the frame members.

4. In a car body construction, the combination of arched frame members of channeled form in cross-section and extending continuously from the bottom of each side of the body upwardly and across the roof portions of the body, said frame members having the open sides of their channels facing inwardly, sheet metal sections arranged between the adjacent frame members and attached thereto, each section comprising complemental half sections of similar formation extending at opposite sides from the bottom of the body to the roof ridge and forming side wall portions and roof portions, the channeled portions of the frame members being arranged to extend outwardly beyond said sheets to form strengthening beams and the roof portions of the half sheets being provided at the ridge point with abutting edges, and inverted U-shaped shields or ridge pieces fitting over the joined edges of the half sections between the projecting channels of the frame members and rigidly connected with the abutting edges of the half sheets and said projecting channels of the frame members.

5. In a car body construction, the combination of arched frame members of channeled form in cross-section and extending continuously from the bottom of each side of the body upwardly and across the roof portion of the body, said frame members having their open sides facing inwardly and provided with laterally extending flanges, sheet metal sections arranged between adjacent frame members and overlapping and secured to the outer faces of said flanges at their lateral edges, each section comprising complemental half sections of similar form extending at opposite sides from the bottom of the body to the roof ridge and forming side wall portions and roof portions lying inside the plane of the channels of the frame members, and inverted U-shaped shields or ridge pieces fitting over the joined edges of the half sections between the channels of the frame members and rigidly secured to said edges of said half sections and to said channels of the frame members.

6. In a car body construction, the combination of arched frame members of channeled form in cross-section and extending continuously from the bottom of each side of the body upwardly and across the roof portion of the body, said frame members having their open sides facing inwardly and provided with laterally extending flanges, sheet metal sections arranged between adjacent frame members and overlapping and secured to the outer faces of said flanges at their lateral edges, each section comprising complemental half sections of similar form extending at opposite sides from the bottom of the body to the roof ridge and forming side wall portions and roof portions lying inside the plane of the channels of the frame members, inverted U-shaped shields or ridge pieces fitting over the joined edges of the half sections between the channels of the frame members and rigidly secured to said edges of said half sections and to said channels of the frame members, and a running board resting upon the ridge pieces and channeled portions of the frame members and having depending flanges forming grip portions, said flanges being provided with notches receiving and interlocking with the channels of the frame members.

7. A car body structure having a running board extending longitudinally along the center of its roof, said car body structure comprising trough shaped arch body sections, forming transverse divisions of the body, and each comprising side sheet portions and roof sheet portions, joining each other in the center of the width of the car roof under the running board, and supporting and reinforcing frame members of cross-sectionally inverted flanged U-form interposed between and having their flanges lapping and joining the adjacent edges of the side and roof portions of the sheet sections.

8. A car comprising a body formed of a floor, floor supporting longitudinal bottom side sheets at each side of the car, a series of sheet metal sections disposed side by side transversely of the body and each formed of two half sections united at the center of the roof to provide a roof portion and opposite side wall portions from the bottom body secured to and extending continuously from the longitudinal side sheet at one side of the car to the bottom body longitudinal side sheet at the other side of the car, and arched channel frame members of substantially trough shaped cross section and provided with lateral flanges, said frame members being secured to and extending continuously from the bottom body longitudinal side sheet at one side of the car to the bottom body longitudinal side sheet on the opposite side of the car and across the roof between the edges of adjacent sheet metal sections and having their lateral flanges lapping the edges of said sections and uniting said sections to each other.

9. A car comprising a body formed of a floor, floor supporting longitudinally extending side plates adapted to be fastened to the car underframe, a series of sheet metal sections disposed side by side transversely of the body to provide a roof portion and opposite side wall portions extending continuously between said bottom side plates at opposite sides of the car, and arched channel frame members of substantially trough-shaped cross-section extending continuously from the bottom body longitudinal side plate at one side of the car to the bottom body longitudinal side plate at the opposite side of the car and across the roof between adjacent edges of the sheet metal sections and uniting said edges to fasten said sections to each other.

10. A car comprising a body formed of a floor, floor supporting longitudinally extending bottom side plates adapted to be fastened to the car underframe at opposite sides of the car, a series of sheet metal sections disposed side by side transversely of the body to provide a roof portion and opposite side wall portions extending continuously between said longitudinal bottom side plates, and arched channel frame members of substantially trough-shaped cross-section extending continuously from the bottom body longitudinal side plate at one side of the car to the bottom body longitudinal side plate at the opposite side of the car and across the roof between adjacent sheet metal sections and having flanges at opposite sides of their trough-shaped members lapping the edges of the adjacent sheet metal sections and fastened thereto to connect said sheet metal sections and frame members together.

11. A car comprising a body formed of a floor, floor supporting longitudinal bottom side plates adapted to be fastened to the underframe at opposite sides of the car, a series of sheet metal sections disposed side by side transversely of the body to provide a roof portion and opposite side wall portions extending continuously from the longitudinal side plate at one side of the car to the longitudinal side plate at the opposite side of the car, and arched channel frame members of substantially trough-shaped cross-section extending continuously from the bottom longitudinal side plate at one side of the car to the bottom longitudinal side plate at the opposite side of the car and across the roof between the edges of adjacent sheet metal sections and uniting said sections to each other, the channels being provided with flanges fastened to said edges of the sections and having their closed sides facing outwardly and projecting beyond the sheets to form corrugated beams and guards to reinforce and protect the sheets from injury.

12. A car body structure comprising in combination with an underframe semi-arched sheet sections forming transverse divisions of the body, each comprising side sheet portions and a roof sheet portion, and arched frame elements extending along the division lines between the sheet sections and having flanges attached thereto and also having trough shaped stiffening members that form unitary side posts and roof carlines which protrude outwardly beyond the side and roof sheets and act as deflectors to deflect the elements from the joints between the side and roof sheet and the flanges of the arched shaped frame elements.

13. A car body comprising transversely divided sheet metal sections arranged side by side and forming side wall and roof portions, frame members arranged between the adjacent edges of the sheet sections and each of unitary construction to provide posts at opposite sides of the body and a carline across the roof of the body, said post and carline portions of the frame members being of trough shape in cross-section and having lateral flanges in lapping arrangement with said edges of the sheet sections and secured thereto to join the sections together, and side plates extending continuously along each side of the car at the base thereof and tying the lower edges of the side wall portions of the sheet sections and lower ends of the post portions of the frame members together.

14. A car body comprising transversely divided sheet metal sections arranged side by side and forming side wall and roof portions, frame members arranged between the adjacent edges of the sheet sections and each of unitary construction to provide posts at opposite sides of the body and a carline across the roof of the body, said post and carline portions of the frame members being of trough shape in cross-section and having lateral flanges in lapping arrangement with said edges of the sheet sections and secured thereto to join the sections together, the channels of said trough-shaped frame members projecting outwardly beyond the side wall and roof portions of the sheets, and side plates extending continuously along each side of the car at the base thereof and tying the lower edges of the side wall portions of the sheet sections and the lower ends of the post portions of the frame members together.

15. A car body formed of a series of sheet metal sections disposed side by side transversely of the body to provide a roof portion and opposite side wall portions, and arched channeled frame members of trough-shaped cross-section extending between and elastically connecting the adjacent edges of said sheet metal sections together.

16. A car body formed of a series of sheet metal sections disposed side by side transversely of the body to provide a roof portion and opposite side wall portions, and arched channeled frame members of trough-shaped cross-section integral with one edge of each section and fastened to and elastically connecting the same with the adjoining edge of the adjacent section.

17. A car body formed of a series of sheet metal sections disposed side by side transversely of the body to provide a roof portion and opposite side wall portions, arched channeled frame members of trough-shaped cross-section extending between and elastically connecting the adjacent edges of said sheet metal sections together, and side plates extending along the bottom of each side of the body and joining the base portions of the sheet metal sections and frame members together.

18. A car body formed of a series of sheet metal sections disposed side by side transversely of the body to provide a roof portion and opposite side wall portions, arched channeled frame members of trough-shaped cross-section extending between the adjacent edges of said sheet metal sections from the sill lines at the sides upwardly to the eaves lines and thence across the roof, said sections having their channels projecting outwardly beyond the sheets, and bridge plates closing the open sides of the channels.

19. A car body comprising a series of sheet metal sections disposed side by side transversely of the body to provide a roof portion and opposite side wall portions, channeled frame members of trough-shaped cross-section arranged between the adjacent edges of said sheet metal sections to provide unitary side posts and carlines uniting the side wall and roof portions of the sections, and a longitudinally extending plate joining the sheet metal sections and frame members at each side of the body along the sill line, said plates forming supports for the car floor, and a means for connecting a body with the car underframe.

20. A car body comprising arched frame members of channel form in cross-section and extending continuously from the bottom of each side of the body upwardly and across the roof portion of the body, sheet metal sections arranged between the adjacent frame members and attached thereto, each section comprising half sections extending at opposite sides from the bottom of the body to the roof ridge and forming side wall portions and roof portions, the latter-named portions of the half sheets being joined at the ridge point of the roof, and side plates extending continuously along each side of the car at the base thereof and tying the lower edges of the side wall portions of the sheet sections and the lower ends of the frame members together.

21. A car body comprising arched frame members of channeled frame in cross-section and extending continuously from the bottom of each side of the body upwardly and across the roof portions of the body, sheet metal sections arranged between the adjacent frame members and attached thereto, each section comprising half sections extending at opposite sides from the bottom of the body to the roof ridge and forming side wall portions and roof portions, the latter-named portions of the half sheets having abutting edges joined at the ridge point of the roof, and the channels of the arched shaped frame members being arranged to project outwardly beyond the side wall and roof portions of the sheet sections, and side plates extending continuously along each side of the car at the base thereof and tying the lower edges of the side wall portions of the sheet sections and the lower ends of the frame members together.

JOHN J. TATUM.